United States Patent
Yamauchi et al.

(10) Patent No.: US 8,607,941 B2
(45) Date of Patent: Dec. 17, 2013

(54) STEEL SHEET FOR BRAKE DISC, AND BRAKE DISC

(75) Inventors: Katsuhisa Yamauchi, Chiba (JP); Mitsuyuki Fujisawa, Chiba (JP); Yasushi Kato, Tokyo (JP); Hiroki Ota, Chiba (JP); Hideya Furusawa, Chiba (JP); Takumi Ujiro, Chiba (JP)

(73) Assignee: JFE Steel Corporation (JP)

( * ) Notice: Subject to any disclaimer, the term of this patent is extended or adjusted under 35 U.S.C. 154(b) by 0 days.

(21) Appl. No.: 13/375,518

(22) PCT Filed: May 31, 2010

(86) PCT No.: PCT/JP2010/059574
§ 371 (c)(1),
(2), (4) Date: Jan. 30, 2012

(87) PCT Pub. No.: WO2010/140696
PCT Pub. Date: Dec. 9, 2010

(65) Prior Publication Data
US 2012/0125724 A1 May 24, 2012

(30) Foreign Application Priority Data
Jun. 1, 2009 (JP) ................... 2009-132461

(51) Int. Cl.
*C22C 38/52* (2006.01)
(52) U.S. Cl.
USPC .......... 188/218 XL; 148/325; 420/38; 420/70

(58) Field of Classification Search
USPC ......... 188/218 XL; 148/325, 326; 420/69, 70
See application file for complete search history.

(56) References Cited

U.S. PATENT DOCUMENTS

| | | | |
|---|---|---|---|
| 6,884,388 B2* | 4/2005 | Ozaki et al. | 420/70 |
| 8,333,849 B2* | 12/2012 | Yamauchi et al. | 148/325 |
| 2008/0000737 A1* | 1/2008 | Hirasawa et al. | 188/218 XL |
| 2009/0104068 A1* | 4/2009 | Hirasawa et al. | 420/38 |
| 2009/0162240 A1* | 6/2009 | Hirasawa et al. | 420/61 |

FOREIGN PATENT DOCUMENTS

| | | |
|---|---|---|
| JP | 2001-220654 A | 8/2001 |
| JP | 2002-121656 A | 4/2002 |
| JP | 2003-147491 A | 5/2003 |
| JP | 2006-291240 A | 10/2006 |
| JP | 2007-247027 A | 9/2007 |
| WO | 02/18666 A1 | 3/2002 |
| WO | 2006/098056 A1 | 9/2006 |

* cited by examiner

*Primary Examiner* — Christopher Schwartz
(74) *Attorney, Agent, or Firm* — DLA Piper LLP (US)

(57) ABSTRACT

A steel sheet for a brake disc contains, on a mass percent basis, 0.02% or more and less than 0.10% C, 0.6% or less Si, more than 0.5% and 2.0% or less Mn, 0.06% or less P, 0.01% or less S, 0.05% or less Al, 11.0% to 13.5% Cr, 0.01% to 0.30% Ni, 0.10% to 0.60% Nb, 0.03% or more and less than 0.10% N, more than 0.0010% and 0.0060% or less B, and the balance being Fe and incidental impurities, and the steel sheet after quenching has a hardness of 32 HRC to 40 HRC on a Rockwell hardness scale C (HRC).

15 Claims, 4 Drawing Sheets

US 8,607,941 B2

STEEL SHEET FOR BRAKE DISC, AND BRAKE DISC

RELATED APPLICATIONS

This is a §371 of International Application No. PCT/JP2010/059574, with an inter-national filing date of May 31, 2010, which is based on Japanese Patent Application No. 2009-132461, filed Jun. 1, 2009, the subject matter of which is incorporated by reference.

TECHNICAL FIELD

This disclosure relates to steel sheets for brake discs used in two-wheel vehicles, such as motorcycles and bicycles. The disclosure relates to a low-carbon martensitic chromium-containing steel having excellent corrosion resistance, appropriate hardness after quenching, and excellent temper softening resistance to exothermic heat during braking, and relates to a brake disc including the steel sheet.

BACKGROUND

Disc brakes are often used as brake systems for two-wheel vehicles such as motorcycles and bicycles. A disc brake includes a brake disc which is attached to a tire and which rotates together with the tire and brake pads that sandwiches the brake disc. Braking is accomplished by friction between the brake disc and the brake pads. The temperature of the brake disc is repeatedly increased to 500° C. or higher by the friction. Thus, brake discs are required to have high temper softening resistance, i.e., softening is not caused by exothermic heat during breaking, and the change of shape and galling are less likely to occur. For example, the appropriate range of the hardness of brake discs for motorcycles is usually about 30 to about 40 HRC and preferably 32 to 38 HRC on a Rockwell hardness scale C (HRC). Brake discs are required to maintain the hardness within the appropriate range even after they are repeatedly exposed to exothermic heat during braking. A hardness of less than the appropriate range can lead to a reduction in braking force due to the change of shape and galling of brake discs and can lead to cracking of brake discs. A hardness exceeding the appropriate range is liable to cause various problems such as brake squeals and reductions in braking force and pad life due to a reduction in the coefficient of friction. Furthermore, to ensure good appearance and a braking force, brake discs are also required to have corrosion resistance (rusting resistance). For the reasons described above, with respect to materials for brake discs, martensitic stainless steel sheets mainly containing 12% to 13% Cr are used. In particular, low-carbon martensitic stainless steel sheets containing 0.1% or less C are mainly used because an appropriate hardness is easily obtained only by a quenching process.

A lot of openings and chases are arranged in brake discs to improve cooling capability for exothermic heat during braking, eject wear debris and so forth, and achieve weight saving and good design. These openings and chases are formed by punching work or cutting work. So, a material to be worked is required to be soft. Thus, in the case where a brake disc is produced from a steel sheet, the steel sheet is annealed to adjust the hardness to 95 HRB or less on a Rockwell hardness scale B (HRB), formed into a disc shape, subjected to a quenching process in which the disc is held at 900° C. to 1100° C. for about 1 to about 10 minutes and then cooled to adjust the hardness to an appropriate range, and subjected to grind and rust-proofing to provide an end product. As the steel sheet described above, a steel sheet having a small extent of temper softening and a hardness of 30 HRC or more even when held at 500° C. for 60 minutes is used.

The recent improvement in the travelling performance of two-wheel vehicles has required further improvement in brake performance. There have been advances in the development of steel sheets, having higher temper softening resistance (heat resistance), for brake discs. For example, Japanese Unexamined Patent Application Publication Nos. 2001-220654, 2002-121656 and 2003-147491 and International Publication No. WO 02/18666 A1 disclose high-temperature heat-resistant steel sheets containing elements such as C, N, Nb, V, Cu, Ti, Mo, and B which have the effects of enhancing hardenability to obtain a stable as-quenched hardness and increasing temper softening resistance, the steel sheets having a hardness of 30 HRC or more even if tempering treatment is performed at a temperature exceeding 500° C.

The high-temperature heat-resistant steel sheets disclosed in JP '654, JP '656, JP '491 and WO '666 have relatively excellent heat resistance. In heat-resistance evaluation at 500° C. to 550° C. for about 60 minutes, good results are obtained. However, when the steel sheets were held in the temperature range described above for a longer time (for example, about 240 minutes), a sharp reduction in hardness and/or corrosion resistance was observed. That is, the results demonstrated that brake discs including these high-temperature heat-resistant steel sheets have insufficient corrosion resistance and stability of heat resistance when used for a long time (for example, about 240 minutes).

It could therefore be helpful to provide a steel sheet having stable corrosion resistance and the stability of heat resistance over a long period of use (for example, about 240 minutes) when the steel sheet is used as a brake-disc material. Specifically, it could be helpful to provide a steel sheet having hardenability such that the hardness falls within an appropriate range (32 to 40 HRC according to JIS Z2245) after quenching, the steel sheet after the quenching and after tempering having corrosion resistance such that the number of rust points is 4 or less after a salt spray test (SST) for 48 hours, and to provide a brake disc including the steel sheet. Furthermore, it could be helpful to provide a steel sheet having excellent temper softening resistance such that the hardness is in the range of 32 to 40 HRC after quenching, the hardness is in the range of 30 to 40 HRC after tempering treatment at 550° C. for 60 minutes, and the hardness is in the range of 28 to 40 HRC after tempering treatment at 550° C. for 240 minutes, the steel sheet after the quenching and after the tempering having corrosion resistance such that the number of rust points is 4 or less after a salt spray test (SST) for 48 hours, and to provide a brake disc including the steel sheet.

SUMMARY

We conducted detailed studies on the hardenability, heat resistance (specifically, temper softening resistance), and corrosion resistance of steel sheets having various compositions and discovered that the appropriate incorporation of reinforced elements, such as Nb, Ti, V, and Mo, for the purpose of improving the heat resistance results in the formation of a lot of ferrite phases during a quenching process because these elements are ferrite formation elements, thereby causing a reduction in hardness after quenching and tempering. We also discovered that increases in the proportions of austenite formation elements such as Ni and Mn with the incorporation of the reinforced elements enables the formation of a ferrite phase to be inhibited, but it is difficult to maintain the hardness for a long time after tempering, so that some brake discs had to be exchanged. However, we also discovered that the incorporation of appropriate amounts of Nb, N, and B provides the effect of maintaining the hardness for a long time (for example, about 240 minutes) after tempering treatment and is highly effective in improving corrosion resistance after the tempering treatment.

Accordingly, we conducted further studies on a steel composition having high hardness and excellent corrosion resistance even if a steel having a hardness in the appropriate range described above after quenching and after tempering is held at the tempering temperature for a long time, and discovered that a low-carbon martensitic chromium-containing steel which contains appropriate amounts of Nb, N, and B in combination and which has a steel composition that satisfies predetermined relational expressions provides the target properties described above.

We thus provide:

(1) A steel sheet for a brake disc contains on a mass percent basis:
- 0.02% or more and less than 0.10% C,
- 0.6% or less Si,
- more than 0.5% and 2.0% or less Mn,
- 0.06% or less P,
- 0.01% or less S,
- 0.05% or less Al,
- 11.0% to 13.5% Cr,
- 0.01% to 0.30% Ni,
- 0.10% to 0.60% Nb,
- 0.03% or more and less than 0.10% N,
- more than 0.0010% and 0.0060% or less B, and
- the balance being Fe and incidental impurities, in which the steel sheet after quenching has a hardness of 32 HRC to 40 HRC on a Rockwell hardness scale C (HRC), and the steel sheet satisfies expressions (1) to (3):

$$420C+470N+23Ni+9Cu+7Mn-11.5Cr-11.5Si-12Mo-47Nb-52Al-49Ti-23V+189 \geq 85 \quad (1)$$

$$0.04 \leq C+N-13(Nb/93+Ti/48+Zr/91+V/51)-14B/11 \leq 0.09 \quad (2)$$

$$C-12(Nb/93+Ti/48+Zr/91+V/51+Mo/96+Ta/181+W/184) \leq 0.045 \quad (3)$$

wherein each of the symbols of elements in expressions (1) to (3) indicates percent by mass of a corresponding one of the elements contained in the steel sheet.

(2) In the steel sheet for a brake disc described in item (1), the steel sheet for a brake disc further contains
one or more selected from
- 0.01% to 0.10% Co,
- 0.01% to 0.30% Cu,
- 0.01% or more and less than V,
- 0.01% to 0.10% Mo,
- 0.01% to 0.10% Ti,
- 0.01% to 0.10% Zr,
- 0.01% to 0.10% Ta, and
- 0.01% to 0.10% W.

(3) In the steel sheet for a brake disc described in item (1) or (2), the area ratio of a martensitic microstructure in a microstructure after quenching is 75% or more.

(4) In the steel sheet for a brake disc described in any one of items (1) to (3), the hardness after tempering at 550° C. for 240 minutes is in the range of 28 HRC to 40 HRC.

(5) In the steel sheet for a brake disc described in any one of items (1) to (4), the hardness before quenching is in the range of 75 HRB to 95 HRB on a Rockwell hardness scale B (HRB).

(6) In the steel sheet for a brake disc described in any one of items (1) to (5), the B content is in the range of 0.0016% to 0.0060%.

(7) A brake disc includes the steel sheet for a brake disc described in any one of items (1) to (6).

It is thus possible to provide a low-carbon martensitic chromium-containing steel sheet having excellent corrosion resistance, high temper softening resistance at 550° C., and a small reduction in hardness. Thus, in the case where our steel sheet is used for brake discs used in two-wheel vehicles such as motorcycles and bicycles, it is possible to maintain braking stability for a long time for vehicles having higher travelling performance than ever before because the steel sheet has excellent corrosion resistance and the change of shape of the discs due to exothermic heat during braking is less likely to occur.

DETAILED DESCRIPTION

Figure 1:
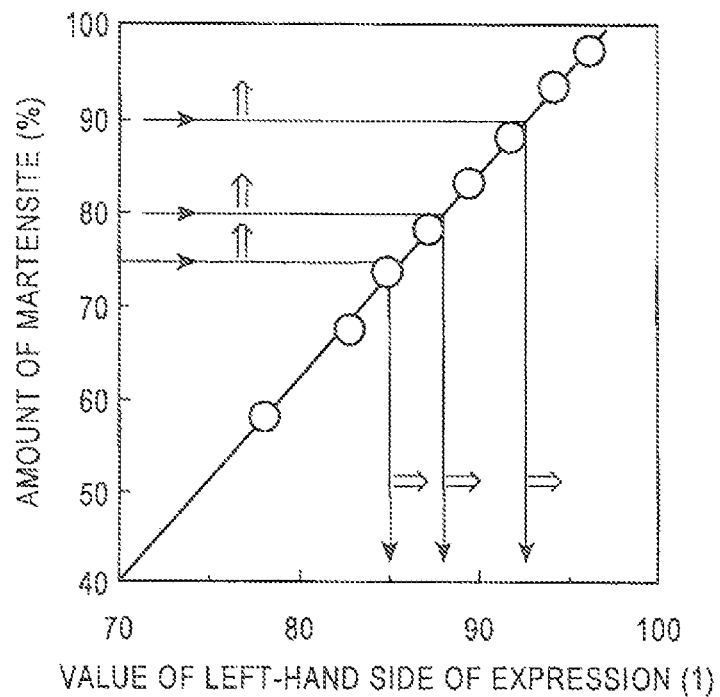
FIG. 1 is a graph showing the relationship between expression (1) and the amount of martensite after a quenching process.

Our steel sheets will be specifically described below.

The reason for the limitation of the composition to achieve desired hardenability, heat resistance, and corrosion resistance will be described. The units of element contents in a steel sheet are "percent by mass" and are simply indicated by "%" unless otherwise specified.

C: 0.02% or More and Less than 0.10%

C is a major element that forms a solid solution or precipitates (carbide, carbonitride, or a mixture thereof) and that has a great influence on the hardness of a steel sheet after quenching and after tempering. To ensure an appropriate hardness after quenching, the C content needs to be 0.02% or more. However, a C content of 0.10% or more results in a significant reduction in corrosion resistance. Furthermore, the growth of C-containing precipitates during tempering is significantly promoted so that a large number of coarse C-containing precipitates are likely to be formed, thereby significantly reducing the heat life (service life in a high-temperature environment) and corrosion resistance. For these reasons, the C content is 0.02% or more and less than 0.10%. The C content is preferably set to 0.04% or more in view of heat resistance. The C content is preferably set to 0.08% or less in view of rusting resistance. To ensure more satisfactory corrosion resistance, the C content is preferably set to 0.06% or less.

Si: 0.6% or Less

Si is an element that functions as a deoxidizing agent. However, a Si content exceeding 0.6% does not result in the sufficient formation of a martensitic phase during the quenching process, thus leading to a reduction in the hardness of a steel sheet after quenching. Furthermore, an excessively high Si content results in a reduction in toughness. So, the Si content is specified as 0.6% or less. The Si content is preferably 0.05% or more in view of the deoxidization effect.

Mn: More than 0.5% and 2.0% or Less

Mn is an element that inhibits the formation of a ferrite phase at a high temperature. So, Mn is an element useful in ensuring a stable austenite zone in a wide temperature range of 900° C. to 1300° C. and sufficient hardenability. To provide the effects, the Mn content needs to be more than 0.5%. However, a Mn content exceeding 2.0% results in significant reductions in formability and corrosion resistance. So, the Mn content is more than 0.5% and 2.0% or less. The Mn content is preferably set to more than 1.0% and more preferably 1.5% or more in view of hardenability.

Al: 0.05% or Less

Al is an element that functions as a deoxidizing agent, similarly to Si. However, an excessively high Al content results in the increase of hard inclusions and precipitates to cause defects, such as surface flaws. So, the Al content is set to 0.05% or less.

In the case where both Al and Si are contained as deoxidizing agents, the Al content is preferably reduced to suppress the increase of inclusions and precipitates. For example, when the Si content is 0.05% or more, the Al content is preferably set to 0.03% or less. When the Si content is 0.10% or more, the Al content is preferably set to 0.01% or less.

Cr: 11.0% to 13.5%

Cr is a major element that improves corrosion resistance of a steel sheet. To ensure corrosion resistance sufficient for a brake-disc material, the Cr content needs to be 11.0% or more. However, a Cr content exceeding 13.5% results in the formation of a large amount of the δ ferrite phase after quenching, thereby failing to provide appropriate hardness and reducing formability and toughness. Accordingly, the Cr content is set in the range of 11.0% to 13.5%. The Cr content is preferably set to 11.5% or more in view of corrosion resistance. The Cr content is preferably set to less than 13.0% in view of formability.

Ni: 0.01% to 0.30%

A Ni content of 0.01% or more results in improvement in the hardenability and corrosion resistance of a steel sheet.

However, a Ni content exceeding 0.30% results in a significant reduction in the diffusion velocity of Cr. So, long-term heat treatment for softening annealing is required when a steel sheet is formed into a brake-disc shape. This causes a reduction in production efficiency and the increase of the amount of scale to cause defects. Furthermore, Ni is an expensive element, thus leading to an increase in material cost. Accordingly, the Ni content is set to 0.30% or less. The adjustment of proportions of other elements inhibits the formation of the δ ferrite phase to improve the corrosion resistance. Thus, the Ni content may be 0.1% or less.

Nb: 0.10% to 0.60%

Nb is an extremely important element, similarly to N and B described below. Nb reacts with C and/or N to form precipitates (nitride, carbide, carbonitride, or a mixture of two or more thereof), thereby delaying dislocation recovery to improve the heat resistance of a steel sheet. To ensure target heat resistance (hardness after tempering treatment at 550° C. for 60 minutes: 30 to 40 HRC; and hardness after tempering treatment at 550° C. for 240 minutes: 28 to 40 HRC), the Nb content needs to be 0.10% or more. However, a Nb content exceeding 0.60% promotes the formation of the precipitates containing Nb and C and/or N, thereby coarsening the precipitates in a short time. As a result, in particular, the amount of C that forms a solid solution in a steel sheet is decreased to cause a reduction in the hardness of the steel sheet after quenching and to cause a reduction in hardness after tempering treatment to accelerate. Accordingly, the Nb content is set in the range of 0.10% to 0.60%, more preferably 0.10% to 0.40%, and still more preferably 0.16% to 0.30%.

N: 0.03% or More and Less than 0.10%

N is an extremely important element, similarly to Nb. As with C, N is an element required to ensure the appropriate hardness of a steel sheet after quenching and after tempering. Furthermore, N has the effect of inhibiting the precipitation of coarse C-containing precipitates (carbide, carbonitride, or a mixture thereof). N is less likely to form precipitates (nitride, carbonitride, or a mixture thereof) than C. The precipitates remain fine. Hence, the combined addition of Nb and B is highly effective in suppressing temper softening over long periods of time. Moreover, N is highly effective in improving corrosion resistance. To provide these effects, the N content needs to be 0.03% or more. However, a N content of 0.10% or more results in a significant reduction in hot ductility and toughness. Accordingly, the N content is 0.03% or more and less than 0.10%. To achieve stable heat resistance and corrosion resistance, the N content is preferably 0.04% or more and more preferably 0.045% or more.

B: More than 0.0010% and 0.0060% or Less

Similarly to Nb and N, B is an extremely important element. B is likely to be present locally at crystal grain boundaries, granulates the microstructure, and inhibits the formation of coarse precipitates at grain boundaries (in particular, precipitates containing C and/or N, for example, carbide, nitride, carbonitride, or a mixture of two or more thereof). So, the combined addition of Nb and N improves the heat resistance of a steel sheet. Thus, B is an element useful in prolonging the lifetime in a high-temperature service environment. To provide these effects, the B content needs to be more than 0.0010%. However, a B content exceeding 0.0060% results in significant reductions in castability and hot ductility because B reacts with Fe or Cr to form a compound, thereby failing to prolong the lifetime in a high-temperature service environment. Accordingly, the B content is more than 0.0010% and 0.0060% or less. B is likely to be present locally in steel. Thus, to stably provide the effects throughout a steel sheet, the B content is preferably set to 0.0016% or more and more preferably 0.0020% or more.

Figure 6:
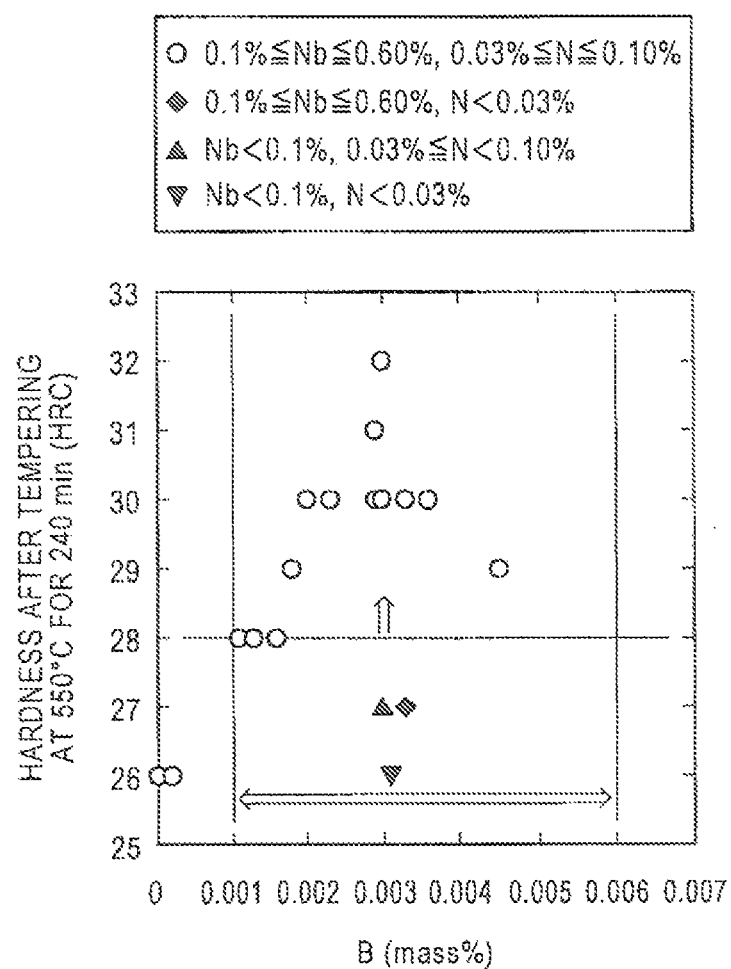
FIG. 6 is a graph showing the relationship between the B content and the hardness after tempering at 550° C. for 240 minutes.

FIG. 6 illustrates the effect of B on the hardness of steels after tempering at 550° C. for 240 minutes when the combined addition of two elements, i.e., Nb and N, is performed in the steels in appropriate ranges and when the addition of at least one of the two elements, i.e., Nb and N, is performed in the steels in an inappropriate range, the steels (steel Nos. 1 to 12, 17, 18, 27, and 29 to 32 in Tables 1 and 2) having compositions of (11.3%-13.1%) Cr—(0.0030%-0.0071%) C—(0.07%-0.30%) Si—(0.85%-1.84%) Mn—(0.001%-0.016%) Al—(0.02%-0.29%) Ni—Nb—N—B—(Cu, Zr, Mo, V, Ti, Co, Ta, W) and satisfying expressions (1), (2), and (3).

In the case where the combined addition of three elements, i.e., Nb, N, and B, are performed in appropriate ranges, it is ensured that the hardness is 28 HRC or more even after a lapse of 240 minutes at 550° C. In contrast, in the case where even one of the three elements, i.e., Nb, N, and B, does not fall within the appropriate range, it is found that the hardness is reduced to 27 HRC or less after a lapse of 240 minutes at 550° C.

As described above, in the case where all the three elements, i.e., Nb, N, and B, are contained in the appropriate ranges, the nonconventional unexpected outstanding effect in which the hardness is 28 HRC or more even after a lapse of 240 minutes at 550° C. is provided.

P: 0.06% or Less

A P content of 0.01% or more results in the contribution of improvement in corrosion resistance. A P content exceeding 0.06% results in reductions in hot ductility and toughness, thereby causing difficulty in producing a steel sheet. Accordingly, the P content is set to 0.06% or less and preferably in the range of 0.01% to 0.04%.

S: 0.01% or Less

A S content of 0.0005% or more results in the contribution of improvement in punching workability. A S content exceeding 0.01% results in significant reductions in hot ductility and corrosion resistance. Accordingly, the S content is set to 0.01% or less. The S content is preferably 0.0005% or more, and preferably 0.006% or less and more preferably 0.004% or less.

To provide a steel sheet having higher heat resistance and corrosion resistance, the steel sheet needs to satisfy the foregoing composition and expressions (1) to (3) described below:

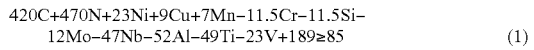

$$420C+470N+23Ni+9Cu+7Mn-11.5Cr-11.5Si-12Mo-47Nb-52Al-49Ti-23V+189 \geq 85 \quad (1)$$

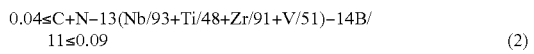

$$0.04 \leq C+N-13(Nb/93+Ti/48+Zr/91+V/51)-14B/11 \leq 0.09 \quad (2)$$

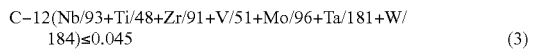

$$C-12(Nb/93+Ti/48+Zr/91+V/51+Mo/96+Ta/181+W/184) \leq 0.045 \quad (3)$$

wherein each of the symbols of elements in expressions (1) to (3) indicates percent by mass of a corresponding one of the elements contained in the steel sheet.

The left-hand side of expression (1) indicates the austenite-forming ability of the steel.

FIG. 1 illustrates the measurement results of the amount of martensite in steels after a quenching process at 1050° C. for 5 minutes, the steels having compositions of Cr—0.06% C—0.1% Si—1.6% Mn—0.002% Al—0.05% Ni—0.2% Nb—0.04% N—0.003% B and having different Cr contents of 11.8% to 13.4%. The horizontal axis of FIG. 1 indicates the value of the left-hand side of expression (1). As illustrated in FIG. 1, when the value of the left-hand side of expression (1) is 85 or more, the area ratio of a martensitic phase in the microstructure of each steel sheet after the quenching process is 75% or more. Note that as a microstructure other than the martensitic phase, one or more of the austenite phase and the ferrite phase may be contained in an amount of less than 25% in total.

Figure 2:
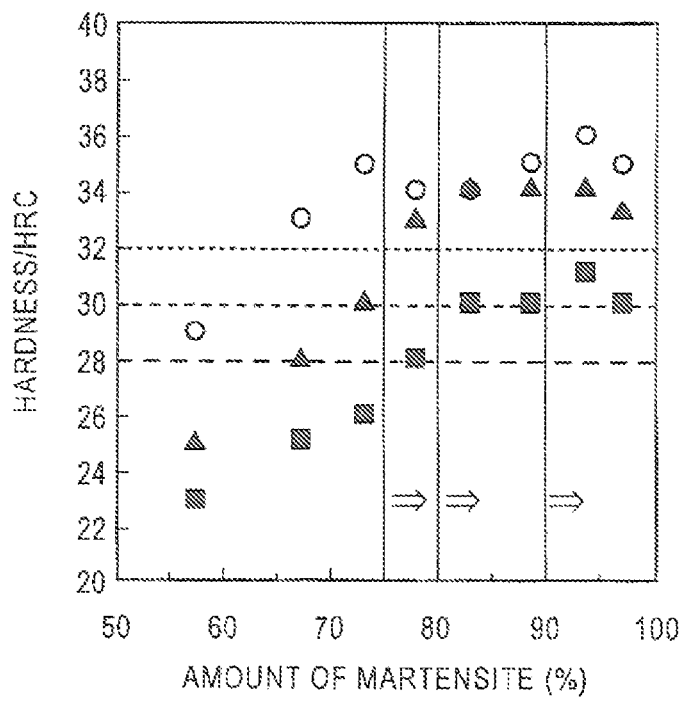
FIG. 2 is a graph showing the relationship between the amount of martensite after the quenching process and the hardness of steel after quenching and after tempering.

FIG. 2 illustrates the hardness of the steel sheets illustrated in FIG. 1 after quenching and after tempering treatment at 550° C. As illustrated in FIG. 2, in the case where 75% of the microstructure of each steel sheet is a martensitic phase after the quenching of the steel sheets, the hardness after the quenching (symbol "○" in FIG. 2) can be set in an appropriate range of 32 to 40 HRC, and the hardness (symbol "▲" in FIG. 2) after tempering treatment at 550° C. for 60 minutes after the quenching can be set in the range of 30 to 40 HRC. Furthermore, as illustrated in FIG. 1, a larger value of the left-hand side of expression (1) results in an increase in the amount of the martensitic phase. Furthermore, the martensitic phase is less likely to be tempered. So, in the case where the area ratio of the martensitic phase in the microstructure of each steel sheet after quenching is 75% or more, the hardness (symbol "■" in FIG. 2) after tempering treatment at 550° C. for 240 minutes can be set in the range of 28 to 40 HRC.

From FIG. 2, the amount of martensite is preferably 80% or more and more preferably 90% or more. Thus, from FIG. 1, the value of the left-hand side of expression (1) is preferably 88 or more and more preferably 93 or more. However, an excessively high value results in difficulty in allowing the hardness of a steel sheet before quenching to be set in the range (75 to 95 HRB) appropriate for punching work. So, the value of the left-hand side of expression (1) is preferably 100 or less.

Figure 3:
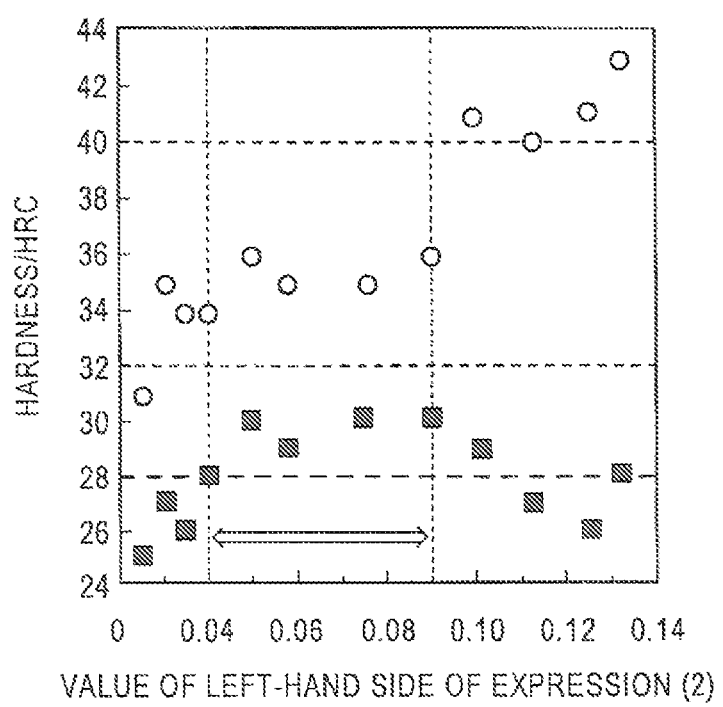
FIG. 3 is a graph showing the relationship between expression (2) and the hardness of steel after quenching and after tempering.

Expression (2) is a conditional expression useful in setting the hardness of the martensitic phase to an appropriate range after quenching and after tempering. C and N in a steel sheet react partially with Cr, Nb, Ti, Zr, V, B, and so forth to form carbide, nitride, carbonitride, or a mixture of two or more thereof (hereinafter, these three compounds are referred to as "carbonitride and so forth"). The remainder of C and N are present in the form of a solid solution containing C and a solid solution containing N. The hardness of the martensitic phase after quenching and after tempering is mainly determined by the total amount of C contained in the solid solution and N contained in the solid solution. So, C+N−13(Nb/93+Ti/48+Zr/91+V/51)−14B/11 is defined as its index in a predetermined range, provided that the presence of carbonitride and so forth is ensured in an as-quenched state or that the C content and the N content are sufficiently ensured with respect to Nb, Ti, Zr, V, and B, which are likely to form carbonitride and so forth in the early stages of tempering. FIG. 3 illustrates the relationship between the value of expression (2) (horizontal axis) and the hardness (symbol "○" in FIG. 3) after quenching and between the value of expression (2) and the hardness (symbol "■" in FIG. 3) after long-term tempering (holding at 550° C. for 240 minutes). Steel sheets satisfying expression (1) and having compositions of 11.4%-13.4% Cr-0.03%-0.09% C-0.1% Si-1.0%-1.6% Mn-0.002% Al-0.01%-0.30% Ni-0.10%-0.60% Nb-0.03%-0.06% N-0.002% B were subjected to a quenching process at 1050° C. for 5 minutes and then tempering treatment at 550° C. for 240 minutes. The horizontal axis of the graph illustrated in FIG. 3 indicates the left-hand side of expression (2). The vertical axis indicates the hardness of the quenching and after the tempering. As is clear from FIG. 3, a value of expression (2) of less than 0.04% results in insufficient hardness (symbol "○" in FIG. 3) after the quenching or results in insufficient hardness (symbol "■" in FIG. 3) after the tempering for 240 minutes because of a significant reduction in hardness due to the tempering time. Meanwhile, when the value of expression (2) exceeds 0.09%, the hardness is outside the upper limit (40 HRC) of the hardness (symbol "○" in FIG. 3) after the quenching or is outside the lower limit (28 HRC) of the hardness (symbol "■" in FIG. 3) after the tempering for 240 minutes. Thus, the value of expression (2) is set in the range of 0.04% to 0.09% and preferably 0.05% to 0.08%.

Expression (3) is a conditional expression useful in ensuring high hardness and excellent corrosion resistance even if a steel sheet is held at a tempering temperature for prolonged periods of time. When a steel sheet is held at a tempering temperature for prolonged periods of time, C and N contained in the steel sheet allow carbonitride and so forth of Nb, Ti, Zr, V, and B as described above to increase and also allow carbonitride and so forth of Cr, Mo, Ta, and W to increase. If the size of the formed carbonitride and so forth is fine, the softening of martensite is inhibited in a tempering process. So, even if tempering treatment is performed for prolonged periods of time, the hardness of a steel sheet can be maintained in an appropriate range. If the carbonitride and so forth are fine, the effect of improving corrosion resistance is provided. However, if the C content is high, C contained in a solid solution is increased to reduce corrosion resistance. Furthermore, the carbonitride and so forth are likely to coarsen during tempering (in particular, Cr carbide is coarsened). So, tempering treatment for prolonged periods of time reduces hardness and corrosion resistance.

Figure 4:
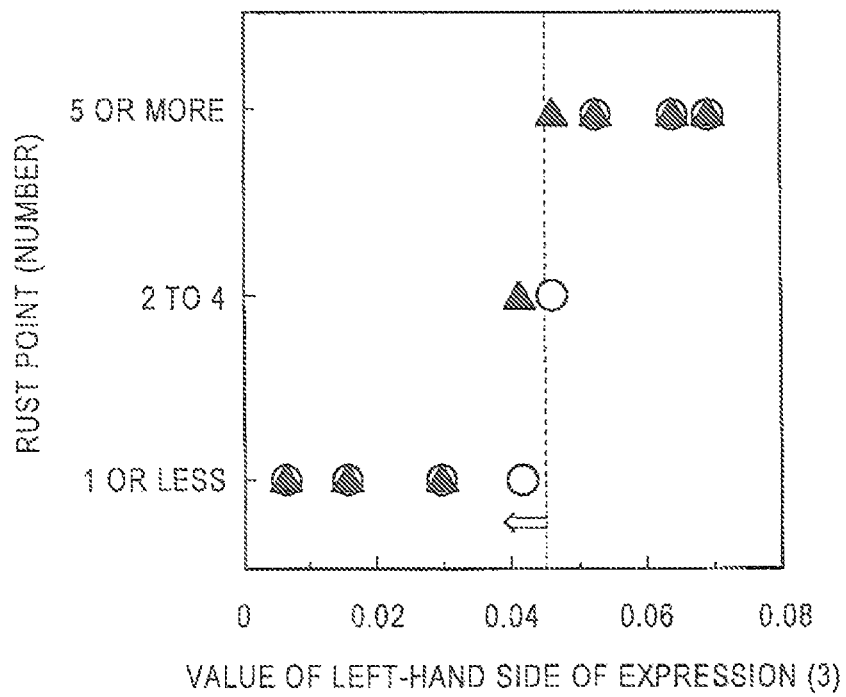
FIG. 4 is a graph showing the relationship between expression (3) and the corrosion resistance of steel after quenching and after tempering.
Figure 5:
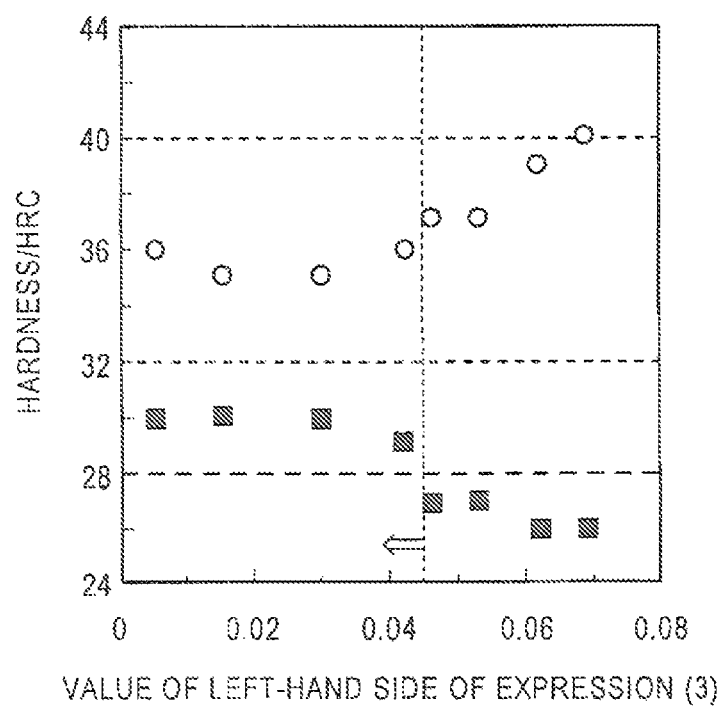
FIG. 5 is a graph showing the relationship between expression (3) and the hardness of steel after quenching and after tempering.

FIG. 4 illustrates the relationship between the value of expression (3) (horizontal axis) and the corrosion resistance (symbol "○" in FIG. 4) after quenching and between the value of expression (3) (horizontal axis) and the corrosion resistance (symbol "▲" in FIG. 4) after longterm tempering (holding at 550° C. for 240 minutes). FIG. 5 illustrates the relationship between the value of expression (3) (horizontal axis) and the hardness (symbol "○" in FIG. 5) after quenching and between the value of expression (3) (horizontal axis) and the hardness (symbol "■" in FIG. 5) after long-term tempering (holding at 550° C. for 240 minutes). Steel sheets satisfying expressions (1) and (2) and having a composition of 12.0%-12.7% Cr—0.05%-0.09% C—0.3% Si—1.5% Mn—0.002% Al—0.05%-0.30% Ni—0.1%-0.30% Nb—0.03% N—0.003% B—(V, Mo, Ti, Zr, Ta) (wherein proportions of V, Mo, Ti, Zr, and Ta are each in the range of 0.01% to 0.10%) are subjected to a quenching process at 1050° C. for 5 minutes and then tempering treatment at 550° C. for 240 minutes. Samples each having dimensions of 70×120 mm are taken from steel sheets (○) after the quenching and steel sheets (▲) after the tempering. Surfaces of the samples are subjected to wet grinding with 600-grit abrasive paper. A salt spray test (SST) was performed for 48 hours under conditions in conformity with Japan Industrial Standard (JIS) Z2371. The number of rust points each having a width of 0.5 mm or more was visually measured for each sample. The hardness (○) of the steel sheets after the quenching and the hardness (■) of the steel sheets after the tempering were measured. The horizontal axis of the graph illustrated in FIG. 4 indicates the left-hand side of expression (3). The vertical axis indicates the number of rust points measured. The horizontal axis of the graph illustrated in FIG. 5 indicates the left-hand side of expression (3). The vertical axis indicates the hardness (○) of the steel sheets after the quenching and the hardness (■) of the steel sheets after the tempering. FIGS. 4 and 5 demonstrate that the corrosion resistance (○) and the hardness (○) after the quenching and the corrosion resistance (▲) and the hardness (■) after the tempering depend significantly on the value of expression (3). So, as an index of the C content of a solid solution and the amounts of coarse carbonitride and so forth formed during the tempering, C-12(Nb/93+Ti/48+Zr/91+V/51+Mo/96+Ta/181+W/184) is defined in a predetermined range. To improve the corrosion resistance and the heat life, the value of expression (3) needs to be 0.045% or less and is preferably 0.04% or less.

To further improve the heat resistance and the corrosion resistance, elements described below may be optionally contained in addition to the basic components described above.

Co: 0.01% to 0.10%

Co has the effects of increasing the hardenability of a steel sheet similarly to Ni and inhibiting the precipitation of carbonitride and so forth to increase the temper softening resistance. To provide the effects, the Co content is preferably 0.01% or more. However, a Co content exceeding 0.10% results in an increase in hardness before quenching, thereby causing difficulty in forming a brake-disc shape. Furthermore, Co is a very expensive element, thus leading to an increase in material cost. Accordingly, the Co content is set to 0.10% or less.

Cu: 0.01% to 0.30%

Cu has the effects of improving the corrosion resistance of a steel sheet and increasing the temper softening resistance by fine precipitation at a tempering temperature of 500° C. to 600° C. To provide the effects, the Cu content is preferably 0.01% or more. However, an excessively high Cu content results in a reduction in hot ductility to cause cracks and scabs during hot rolling. Furthermore, it takes a long time to perform softening annealing treatment of a hot-rolled steel sheet before the hot-rolled steel sheet is formed into a brake-disc shape, thereby reducing production efficiency and leading to an excessive increase in hardness after tempering. Accordingly, the Cu content is set to 0.30% or less.

Mo, Ti, Zr, Ta, and W: 0.01% to 0.10% each; V: 0.01% or more and less than 0.15%

V, Mo, Ti, Zr, Ta, and W are elements that increase the heat resistance of a steel sheet. To provide the effect, each element is preferably contained in an amount of 0.01% or more. However, excessively high proportions of these elements, which form carbonitride and so forth, result in the significant hardening or softening of carbonitride and so forth, leading to a steel sheet having a hardness outside an appropriate range after quenching and after tempering. Thus, the proportions of Mo, Ti, Zr, Ta, and W are each set to 0.10% or less. The V content is set to less than 0.15%. To provide a steel sheet having a hardness in an appropriate range after quenching and after tempering, the total proportion of these elements is preferably set to 0.30% or less. Furthermore, to ensure stable heat resistance in a temperature range exceeding 550° C., the total proportion of these elements is preferably set to 0.11% or more.

Further addition of Ca and/or Mg in an amount of 0.0003% to 0.030% in addition to the elements described above is effective in improving formability during hot rolling. The addition of Hf and rare-earth elements (REMs) in amounts of 0.001% to 0.02% is effective in view of the heat resistance, rusting resistance, and productivity of a steel sheet.

The limitation of the composition of a steel sheet to the foregoing composition and relational expressions imparts desired hardenability, heat resistance, and corrosion resistance to the steel sheet. It is thus possible to provide a steel sheet having excellent heat resistance and corrosion resistance by a common quenching process, the steel sheet being suitable for a brake disc, 75% or more of the microstructure after quenching being a martensitic phase, and the hardness after the quenching being in an appropriate range (32 to 40 HRC).

A material is subjected to punching work before quenching and thus needs to be softened to some extent. A method of softening annealing will be described below. A material having a hardness exceeding 95 HRB before quenching is liable to be cracked during punching because of its high hardness. A material having a hardness of less than 75 HRB, which is soft, is liable to sag during punching. Accordingly, a material before quenching preferably has a hardness of 75 to 95 HRB. For the same reason, the hardness is more preferably in the range of 80 to 90 HRB.

A method for producing a steel sheet for a brake disc will be described below.

The method for producing a steel sheet need not be particularly limited. A known method may be employed. For example, a steel having the foregoing composition is melted with a steel converter or an electric furnace, refined by vacuum oxygen decarburization (VOD) or argon oxygen decarburization (AOD), and formed into a steel ingot by continuous casting or the like. The ingot is subjected to hot rolling at 1050° C. to 1250° C. to provide a hot-rolled steel sheet having a predetermined thickness. Subsequently, to facilitate the formation of a brake-disc shape, the steel sheet is subjected to softening annealing to adjust the hardness of the steel sheet to 75 to 95 HRB and preferably 80 to 90 HRB. The softening annealing conditions are as follows: for example, the steel sheet is held at 650° C. to 880° C. for 4 hours or more with a box annealing furnace, a continuous annealing furnace, or the like and then slowly cooled. Thus, a martensitic phase is sufficiently tempered to form a ferrite phase and coarsen carbonitride and so forth, whereby the steel sheet is softened.

Hot leveling with a leveler and descaling by grinding or pickling are performed, as needed. Furthermore, annealing, descaling, and so forth may be performed after cold rolling. Moreover, hot leveling may be performed by skin pass rolling or the like.

As described above, the steel sheet for a brake disc is produced.

The microstructure of the steel sheet before quenching is formed of, for example, a tempered martensitic phase, a ferrite phase, retained austenite phase, and carbonitride and so forth. The hardness of each phase is changed during tempering. So, the hardness of the steel sheet is not uniquely determined from proportions of the phases. However, when the area ratio of the ferrite phase is at least 75% or more, the steel sheet has a satisfactory hardness as a steel sheet before quenching even if the total area ratio of other phases is less than 25%.

The microstructure before quenching can be observed according to a method for measuring the area ratio of martensite in a quenching test described below.

A method for producing a brake disc including the steel sheet for a brake disc will be described below.

The steel sheet for a brake disc is subjected to punching work and cutting work into a brake-disc shape, followed by a quenching process to adjust the hardness to 32 to 40 HRC, which is an appropriate range. The quenching process is performed as follows: as commonly performed, the resulting article is heated to 900° C. to 1300° C., held at the maximum temperature for about 1 second to about 30 minutes, and then cooled at a cooling rate equal to or more than that of air cooling. Preferably, the heating temperature is set to 900° C. to 1100° C. Preferably, the holding time is set to 10 minutes or less. A quenching method need not be particularly limited. A common quenching method may be employed. Examples thereof include a method in which the article is placed in an air furnace or an atmosphere furnace set at a predetermined temperature; and a method in which a radio-frequency heating furnace, which can rapidly increase temperature, is used. Any cooling method may be employed as long as a desired microstructure and hardness are provided after quenching. Examples thereof include water cooling, oil cooling, gas cooling, air cooling, and die press (press quenching) that contributes to leveling and cooling.

EXAMPLES

Steel Nos. 1 to 32 having compositions described in Table 1 were melted, cast, and formed into steel ingots each having a thickness of 170 mm with a high-frequency melting furnace. The steel ingots were subjected to soaking at 1150° C. for 30 minutes or more and then common hot rolling to provide hot-rolled steel sheets each having a thickness of 4 to 6 mm. The hot-rolled steel sheets were annealed in a temperature range of 700° C. to 850° C. for 8 hours or more and slowly cooled at a cooling rate of 20° C./h or less, thereby providing hot-rolled annealed sheets.

Evaluation tests described below were performed using the resulting hot-rolled annealed sheets.

(1) Hardenability Test

Pieces each having a size of 20 to 30 mm were cut out from the hot-rolled annealed sheets and subjected to a quenching process under conditions described in Table 2 to produce quenched samples (sample Nos. 1 to 32). The following quenching conditions were used: the heating temperature was in the range of 950° C. to 1200° C., the holding time at a heating temperature set for each sample±10° C. was in the range of 1 to 600 seconds, and then the pieces were air-cooled. The samples after the quenching process were ground to completely remove scale on their surfaces. The hardness of a surface of each sample was measured with a Rockwell hardness tester on scale C in conformity with JIS Z2245. When measurement values were in the range of 32 to 40 HRC, the hardness after the quenching process was evaluated to be satisfactory. Note that a hardness of 33 to 38 HRC was extremely satisfactory. The amount of martensite (area ratio) (%) of each sample after the quenching process was measured. Measurement of the amount of martensite (area ratio) was performed by grinding sections of the samples, corroding the sections with the Murakami test reagent, and performing imaging analysis. The measurement was performed at five points for each sample, and a mean value thereof was defined as the amount of martensite (area ratio) of the corresponding sample.

(2) Heat Resistance Test

The quenched samples described above were subjected to tempering treatment under conditions described in Table 2 to produce tempered samples (sample Nos. 1 to 32). The following tempering conditions were used: the heating temperature was 550° C., the holding times at the heating temperature were 60 minutes and 240 minutes, and then the samples were air-cooled. The samples after the tempering treatment were ground to completely remove scale on their surfaces. The Rockwell hardness of a surface of each sample was measured as described in Section (1) Hardenability Test. For samples after holding for 60 minutes, when measurement values were in the range of 30 to 40 HRC, the heat resistance was evaluated to be satisfactory. For samples after holding for 240 minutes, when measurement values were in the range of 28 to 40 HRC, the heat resistance was evaluated to be satisfactory. Note that a hardness of 30 to 38 HRC was extremely satisfactory.

(3) Corrosion Resistance Test

Samples each having a size of 70 to 120 mm were taken from the hot-rolled annealed sheets described above. The samples were subjected to a quenching process under conditions described in Table 2 or were subjected to a quenching process and then tempering treatment under conditions described in Table 2. The resulting samples were subjected to wet grinding with 600-grit abrasive paper and then a salt spray test (SST) for 48 hours under conditions in conformity with JIS Z2371. The number of rust points each having a width of 0.5 mm or more was visually measured for each sample. Evaluation criteria were described below:

Good: the number of rust points is 0 to 1
Pass: the number of rust points is 2 to 4
Bad: the number of rust points is 5 or more.

Table 2 shows the evaluation results. Sample Nos. 1 to 12, 29, and 30 according to Examples each had a hardness of 32 HRC or more after the quenching process. Furthermore, sample Nos. 1 to 12, 29, and 30 each had a hardness of 30 HRC or more after the tempering treatment at 550° C. for 60 minutes and a hardness of 28 HRC or more after the tempering treatment at 550° C. for 240 minutes. So, satisfactory heat resistance was obtained. In contrast, for sample Nos. 13 to 28, 31, and 32 according to Comparative Examples, one of the hardness after the quenching process, the hardness after the tempering treatment, and the corrosion resistance was poor, thus failing to satisfy our target properties.

INDUSTRIAL APPLICABILITY

There are provided a steel sheet having stable corrosion resistance and heat resistance (stability of heat resistance) over a long period of use when the steel sheet is used as a brake-disc material, and a brake disc produced from the steel sheet.

TABLE 1

| Steel No. | Chemical composition (mass %) | | | | | | | | | | | Additional component | expression (1) | expression (2) | expression (3) | Class |
| --- | --- | --- | --- | --- | --- | --- | --- | --- | --- | --- | --- | --- | --- | --- | --- | --- |
| | C | Si | Mn | P | S | Cr | Ni | Al | Nb | N | B | | | | | |
| 1 | 0.052 | 0.20 | 1.70 | 0.020 | 0.001 | 12.4 | 0.09 | 0.002 | 0.23 | 0.045 | 0.0023 | | 90.1 | 0.062 | 0.022 | Example |
| 2 | 0.056 | 0.09 | 1.48 | 0.032 | 0.007 | 12.5 | 0.25 | 0.001 | 0.25 | 0.042 | 0.0018 | Cu: 0.02, Zr: 0.04, Mo: 0.05 | 91.4 | 0.055 | 0.012 | Example |
| 3 | 0.043 | 0.30 | 1.51 | 0.028 | 0.002 | 12.1 | 0.06 | 0.002 | 0.11 | 0.038 | 0.0020 | Cu: 0.03, V: 0.05 | 88.1 | 0.050 | 0.017 | Example |
| 4 | 0.030 | 0.15 | 1.74 | 0.033 | 0.001 | 12.4 | 0.13 | 0.001 | 0.16 | 0.057 | 0.0036 | | 91.7 | 0.060 | 0.009 | Example |
| 5 | 0.040 | 0.11 | 1.32 | 0.020 | 0.004 | 11.8 | 0.03 | 0.005 | 0.26 | 0.065 | 0.0033 | Ti: 0.05, Mo: 0.10 | 93.2 | 0.051 | −0.019 | Example |
| 6 | 0.067 | 0.10 | 1.84 | 0.019 | 0.005 | 13.1 | 0.23 | 0.001 | 0.15 | 0.030 | 0.0045 | Cu: 0.27, Co: 0.05, Ta: 0.08 | 92.9 | 0.070 | 0.042 | Example |
| 7 | 0.053 | 0.28 | 1.45 | 0.033 | 0.002 | 12.2 | 0.05 | 0.002 | 0.20 | 0.044 | 0.0029 | | 90.2 | 0.065 | 0.027 | Example |
| 8 | 0.066 | 0.07 | 1.17 | 0.033 | 0.002 | 11.3 | 0.04 | 0.016 | 0.42 | 0.048 | 0.0018 | Cu: 0.04, Zr: 0.04 | 97.4 | 0.047 | 0.007 | Example |
| 9 | 0.048 | 0.19 | 1.59 | 0.033 | 0.002 | 12.4 | 0.29 | 0.003 | 0.23 | 0.040 | 0.0029 | Cu: 0.15, W: 0.09 | 91.4 | 0.052 | 0.012 | Example |
| 10 | 0.042 | 0.22 | 1.65 | 0.025 | 0.001 | 11.9 | 0.10 | 0.001 | 0.15 | 0.045 | 0.0030 | | 95.2 | 0.062 | 0.023 | Example |
| 11 | 0.059 | 0.15 | 1.48 | 0.028 | 0.005 | 12.4 | 0.02 | 0.002 | 0.18 | 0.034 | 0.0016 | V: 0.09 | 85.6 | 0.043 | 0.015 | Example |
| 12 | 0.054 | 0.09 | 0.85 | 0.029 | 0.001 | 12.8 | 0.10 | 0.004 | 0.13 | 0.061 | 0.0030 | Cu: 0.30, Co: 0.10, Ti: 0.01, Mo: 0.10 | 95.1 | 0.090 | 0.022 | Example |
| 13 | 0.062 | 0.30 | 1.57 | 0.032 | 0.003 | 12.5 | 0.09 | 0.001 | 0.32 | 0.030 | 0.0021 | Cu: 0.22 | <u>81.9</u> | 0.045 | 0.021 | Comparative Example |
| 14 | 0.095 | 0.32 | 1.50 | 0.028 | 0.002 | 12.7 | 0.04 | 0.002 | 0.11 | <u>0.028</u> | 0.0025 | Cu: 0.01, V: 0.05 | 97.4 | 0.092 | <u>0.069</u> | Comparative Example |
| 15 | 0.048 | 0.13 | 1.85 | 0.018 | 0.001 | 11.6 | 0.10 | 0.001 | 0.19 | <u>0.019</u> | 0.0016 | Ta: 0.09 | 89.5 | <u>0.038</u> | 0.018 | Comparative Example |
| 16 | 0.074 | 0.20 | 1.65 | 0.024 | 0.006 | 12.3 | 0.06 | 0.016 | 0.22 | <u>0.015</u> | 0.0015 | | 85.1 | 0.056 | <u>0.046</u> | Comparative Example |
| 17 | 0.071 | 0.11 | 1.23 | 0.020 | 0.007 | 11.2 | 0.20 | 0.005 | 0.20 | <u>0.020</u> | 0.0033 | Cu: 0.01, V: 0.03, Mo: 0.01 | 99.9 | 0.051 | 0.026 | Comparative Example |
| 18 | 0.055 | 0.10 | 1.57 | 0.019 | 0.005 | 13.0 | 0.20 | 0.001 | 0.20 | 0.048 | <u>0.0002</u> | Ti: 0.10 | 85.2 | 0.048 | 0.004 | Comparative Example |
| 19 | 0.044 | 0.07 | <u>2.06</u> | 0.030 | 0.001 | 12.0 | 0.13 | 0.019 | 0.34 | 0.034 | 0.0020 | Cu: 0.25, Zr: 0.05 | 87.3 | <u>0.021</u> | −0.006 | Comparative Example |
| 20 | 0.058 | 0.18 | 0.90 | 0.025 | 0.001 | 11.6 | 0.10 | 0.001 | 0.16 | 0.039 | 0.0017 | <u>Ti: 0.21</u> | 87.0 | <u>0.016</u> | −0.015 | Comparative Example |
| 21 | 0.039 | 0.09 | 1.20 | 0.015 | 0.001 | <u>13.7</u> | 0.30 | 0.004 | 0.25 | 0.060 | 0.0030 | Co: 0.10, Mo: 0.10 | <u>77.1</u> | 0.060 | −0.006 | Comparative Example |
| 22 | 0.061 | 0.14 | 1.05 | 0.019 | 0.003 | 12.6 | 0.10 | 0.002 | 0.13 | 0.027 | 0.0018 | | <u>84.2</u> | 0.068 | 0.044 | Comparative Example |
| 23 | 0.069 | 0.22 | 1.54 | 0.030 | 0.004 | 12.5 | 0.02 | 0.001 | — | 0.012 | — | Zr: 0.04 | 88.5 | 0.075 | <u>0.064</u> | Comparative Example |
| 24 | 0.057 | 0.28 | 1.44 | 0.025 | 0.001 | 12.4 | 0.02 | 0.003 | 0.30 | 0.040 | 0.0021 | <u>Cu: 0.98</u>, W: 0.05 | 91.0 | 0.052 | 0.015 | Comparative Example |
| 25 | 0.066 | 0.18 | 1.96 | 0.009 | 0.004 | 12.5 | 0.25 | 0.010 | <u>0.76</u> | 0.050 | 0.0030 | | <u>77.6</u> | <u>0.006</u> | −0.032 | Comparative Example |
| 26 | 0.075 | 0.34 | 1.55 | 0.031 | 0.006 | <u>10.8</u> | 0.03 | 0.021 | <u>0.08</u> | <u>0.008</u> | 0.0025 | Ti: 0.01 | 97.9 | 0.042 | 0.040 | Comparative Example |
| 27 | 0.062 | 0.08 | 0.85 | 0.030 | 0.003 | 11.7 | 0.10 | 0.002 | 0.20 | 0.030 | — | Cu: 0.02, Co: 0.05, Ti: 0.05, Mo: 0.10 | 88.9 | 0.051 | 0.011 | Comparative Example |
| 28 | 0.048 | 0.27 | 1.55 | 0.033 | 0.003 | 12.4 | 0.15 | 0.001 | 0.15 | 0.034 | 0.0018 | <u>V: 0.16</u> | <u>83.0</u> | <u>0.018</u> | −0.009 | Comparative Example |
| 29 | 0.051 | 0.21 | 1.51 | 0.033 | 0.002 | 12.3 | 0.09 | 0.005 | 0.21 | 0.045 | 0.0011 | — | 90.6 | 0.065 | 0.024 | Example |
| 30 | 0.049 | 0.19 | 1.69 | 0.031 | 0.002 | 12.2 | 0.11 | 0.030 | 0.21 | 0.048 | 0.0013 | — | 92.2 | 0.066 | 0.022 | Example |
| 31 | 0.042 | 0.23 | 1.71 | 0.030 | 0.003 | 12.7 | 0.08 | 0.004 | <u>0.05</u> | 0.048 | 0.0030 | — | 92.6 | 0.079 | 0.036 | Comparative Example |
| 32 | 0.045 | 0.13 | 1.77 | 0.028 | 0.002 | 11.7 | 0.09 | 0.004 | <u>0.05</u> | <u>0.018</u> | 0.0031 | — | 91.6 | 0.052 | 0.039 | Comparative Example |

TABLE 2

| Steel No. | Quenching conditions Temperature (° C.) | Quenching conditions Holding time (sec) | Amount of martensite after quenching (%) | Hardness after quenching (HRC) | Hardness after tempering (HRC) 550° C. × 60 min | Hardness after tempering (HRC) 550° C. × 240 min | Corrosion resistance After quenching | Corrosion resistance After tempering | Class |
|---|---|---|---|---|---|---|---|---|---|
| 1 | 1130 | 5 | 84 | 35 | 35 | 30 | ○: good | ○: good | Example |
| 2 | 1000 | 300 | 83 | 36 | 35 | 29 | Δ: pass | Δ: pass | Example |
| 3 | 1080 | 10 | 83 | 35 | 34 | 30 | ○: good | ○: good | Example |
| 4 | 1050 | 10 | 85 | 35 | 34 | 30 | ○: good | ○: good | Example |
| 5 | 980 | 600 | 91 | 34 | 34 | 30 | ○: good | ○: good | Example |
| 6 | 1070 | 60 | 86 | 35 | 35 | 29 | ○: good | Δ: pass | Example |
| 7 | 980 | 300 | 86 | 35 | 35 | 30 | ○: good | ○: good | Example |
| 8 | 1050 | 30 | 97 | 36 | 37 | 29 | Δ: pass | Δ: pass | Example |
| 9 | 1050 | 60 | 86 | 35 | 36 | 31 | ○: good | ○: good | Example |
| 10 | 1020 | 60 | 96 | 35 | 36 | 30 | ○: good | ○: good | Example |
| 11 | 1050 | 30 | 77 | 34 | 33 | 28 | ○: good | Δ: pass | Example |
| 12 | 1100 | 30 | 85 | 37 | 39 | 32 | ○: good | ○: good | Example |
| 13 | 1050 | 10 | 72 | 35 | 35 | <u>26</u> | ○: good | ○: good | Comparative Example |
| 14 | 1000 | 60 | 93 | 39 | 40 | <u>26</u> | Δ: pass | x: bad | Comparative Example |
| 15 | 1040 | 30 | 94 | 33 | 32 | <u>25</u> | ○: good | Δ: pass | Comparative Example |
| 16 | 960 | 10 | 84 | 36 | 32 | <u>24</u> | Δ: pass | x: bad | Comparative Example |
| 17 | 980 | 600 | 99 | 35 | 36 | <u>27</u> | x: bad | x: bad | Comparative Example |
| 18 | 1050 | 20 | 74 | 36 | 33 | <u>26</u> | Δ: pass | x: bad | Comparative Example |
| 19 | 950 | 300 | 86 | 35 | 35 | <u>26</u> | ○: good | ○: good | Comparative Example |
| 20 | 1050 | 60 | 96 | 34 | 33 | <u>26</u> | ○: good | ○: good | Comparative Example |
| 21 | 1130 | 60 | 53 | <u>31</u> | 31 | <u>25</u> | ○: good | ○: good | Comparative Example |
| 22 | 1080 | 5 | 71 | 35 | 33 | <u>26</u> | ○: good | Δ: pass | Comparative Example |
| 23 | 1030 | 60 | 87 | 35 | <u>26</u> | <u>22</u> | Δ: pass | x: bad | Comparative Example |
| 24 | 1100 | 120 | 88 | 36 | <u>42</u> | 31 | ○: good | ○: good | Comparative Example |
| 25 | 980 | 300 | 60 | <u>31</u> | <u>28</u> | <u>23</u> | ○: good | ○: good | Comparative Example |
| 26 | 1020 | 120 | 100 | 36 | 33 | <u>26</u> | x: bad | x: bad | Comparative Example |
| 27 | 1000 | 60 | 88 | 36 | 35 | <u>26</u> | ○: good | ○: good | Comparative Example |
| 28 | 1000 | 60 | 72 | 35 | 34 | <u>27</u> | ○: good | ○: good | Comparative Example |
| 29 | 1050 | 60 | 85 | 35 | 35 | 28 | ○: good | ○: good | Example |
| 30 | 1050 | 60 | 89 | 35 | 35 | 28 | ○: good | ○: good | Example |
| 31 | 1050 | 60 | 89 | 35 | 34 | <u>27</u> | ○: good | ○: good | Comparative Example |
| 32 | 1050 | 60 | 87 | 35 | 35 | <u>26</u> | ○: good | ○: good | Comparative Example |

The invention claimed is:

1. A steel sheet for a brake disc, comprising, on a mass percent basis:
0.02% or more and less than 0.10% C,
0.6% or less Si,
more than 0.5% and 2.0% or less Mn,
0.06% or less P,
0.01% or less S,
0.05% or less Al,
11.0% to 13.5% Cr,
0.01% to 0.30% Ni,
0.10% to 0.60% Nb,
0.03% or more and less than 0.10% N,
more than 0.0016% and 0.0060% or less B, and
the balance being Fe and incidental impurities, wherein the steel sheet after quenching has a hardness of 32 HRC to 40 HRC on a Rockwell hardness scale C (HRC), and the steel sheet satisfies expressions (1) to (3):

$$420C+470N+23Ni+9Cu+7Mn-11.5Cr-11.5Si-12Mo-47Nb-52Al-49Ti-23V+189 \geq 85 \quad (1)$$

$$0.04 \leq C+N-13(Nb/93+Ti/48+Zr/91+V/51)-14B/11 \leq 0.09 \quad (2)$$

$$C-12(Nb/93+Ti/48+Zr/91+V/51+Mo/96+Ta/181+/184) \leq 0.045 \quad (3)$$

2. The steel sheet according to claim 1, further comprising: one or more selected from
0.01% to 0.10% Co,
0.01% to 0.30% Cu,
0.01% or more and less than 0.15% V,
0.01% to 0.10% Mo, 0.01% to 0.10% Ti,
0.01% to 0.10% Zr,
0.01% to 0.0% Ta, and
0.01% to 0.10% W.

3. The steel sheet accod to claim 2, wherein an area ratio of a martensitcicr a microsiructure in a microstructure of the steel sheet after quenching is 75% or more.

4. The steel sheet according to claim 2, wherein the hardness after tempering at 550° C. for 240 minutes is 28 HRC to 40 HRC.

5. The steel sheet according to claim 2, wherein the hardness before quenching is 75 HRB to 95 HRB on a Rockwell hardness scale B (HRB).

6. A brake disc comprising the steel sheet for a brake disc according to claim 2.

7. The steel sheet according to claim 1, wherein a ratio of a martensitic microstructure in a microstructure of the steel sheet after quenching is 75% or more.

8. The steel sheet according to claim 7, wherein the hardness after temnering at 550° C. for 240 minutes is 28 HRC to 40 HRC.

9. The steel sheet according to claim 7, wherein the hardness before quenching is 75 HRB to 95 HRB on a Rockwell hardness scale B (HRB).

10. A brake disc comprising the steel sheet for a brake disc according to claim 7.

11. The steel sheet according to claim 1, wherein the hardness after tempering at 550° C. for 240 minutes is 28 HRC to 40 HRC.

12. The steel sheet according to claim 11, wherein the hardness before quenching is 75 HRB to 95 HRB on a Rockwell hardness scale B (HRB).

13. A brake disc comprising the steel sheet for a brake disc according to claim 11.

14. The steel sheet according to claim 1, wherein the hardness before quenching is 75 HRB to 95 HRB on a Rockwell hardness scale B (HRB).

15. A brake disc comprising the steel sheet for a brake disc according to claim 1.

* * * * *

UNITED STATES PATENT AND TRADEMARK OFFICE
CERTIFICATE OF CORRECTION

PATENT NO. : 8,607,941 B2  
APPLICATION NO. : 13/375518  
DATED : December 17, 2013  
INVENTOR(S) : Yamauchi et al.

It is certified that error appears in the above-identified patent and that said Letters Patent is hereby corrected as shown below:

In the Claims

In Column 16, line 62,

At Claim 1, after "(3)", please insert -- wherein each symbol of elements in expressions (1) to (3) indicates percent by mass of a corresponding one of the elements contained in the steel sheet. --

Signed and Sealed this
Eighth Day of July, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,607,941 B2  
APPLICATION NO. : 13/375518  
DATED : December 17, 2013  
INVENTOR(S) : Yamauchi et al.

Page 1 of 1

It is certified that error appears in the above-identified patent and that said Letters Patent is hereby corrected as shown below:

In the claims

In Column 17, line 3,

At Claim 2, please change "0.0% Ta" to --0.10% Ta--.

Signed and Sealed this
Twenty-ninth Day of March, 2016

Michelle K. Lee
*Director of the United States Patent and Trademark Office*